United States Patent [19]
Gokita

[11] Patent Number: 5,347,298
[45] Date of Patent: Sep. 13, 1994

[54] EXPOSURE CONTROL DEVICE FOR USE IN ELECTROPHOTOGRAPHIC PRINTING APPARATUS

[75] Inventor: Masami Gokita, Tokyo, Japan

[73] Assignee: Kabushiki Kaisha Toshiba, Kawasaki, Japan

[21] Appl. No.: 841,546

[22] Filed: Feb. 26, 1992

[30] Foreign Application Priority Data

Feb. 28, 1991 [JP] Japan .................. 3-059512

[51] Int. Cl.$^5$ ............................ G01D 9/42
[52] U.S. Cl. .................... 346/108; 358/298
[58] Field of Search ............ 346/108, 160, 76 L; 358/298

[56] References Cited

U.S. PATENT DOCUMENTS

| | | | |
|---|---|---|---|
| 4,201,994 | 5/1980 | Hoshito et al. | 346/108 |
| 4,214,154 | 7/1980 | Sato | 346/108 |
| 4,727,382 | 2/1988 | Negishi et al. | 250/201 |
| 4,742,363 | 5/1988 | Shiraishi | 346/108 |
| 5,043,745 | 8/1991 | Inoue et al. | 346/108 |
| 5,130,524 | 7/1992 | Egawa et al. | 250/205 |
| 5,151,586 | 9/1992 | Sato et al. | 250/205 |
| 5,189,441 | 2/1993 | Fukui et al. | 346/160 |
| 5,280,306 | 1/1994 | Yamaguchi | 346/108 |

FOREIGN PATENT DOCUMENTS

| | | |
|---|---|---|
| 0134472 | 3/1985 | European Pat. Off. . |
| 0217325 | 4/1987 | European Pat. Off. . |
| 1-234813 | 9/1989 | Japan . |

*Primary Examiner*—Benjamin R. Fuller
*Assistant Examiner*—Randy W. Gibson
*Attorney, Agent, or Firm*—Foley & Lardner

[57] ABSTRACT

An electrophotographic printing apparatus including a semiconductor laser for generating a laser beam, a laser optical system for guiding the laser beam from the semiconductor laser, to repeatedly scan a scanning range constituted by an exposure area and a non-exposure area external to the exposure area, a sensing unit for sensing the laser beam falling on a reference position of the non-exposure area which is adjacent to the end of the exposure area at which exposure starts, and a control unit for controlling the semiconductor laser by synchronizing the timing of a scanning start for the exposure area with a sense signal from the sensing unit. In the exposure control device, the control unit includes a laser control circuit for energizing the semiconductor laser to generate a laser beam which has a first laser power when the laser optical system guides the laser beam to the exposure area, and a second laser power when the laser optical system guides the laser beam to the reference position.

17 Claims, 11 Drawing Sheets

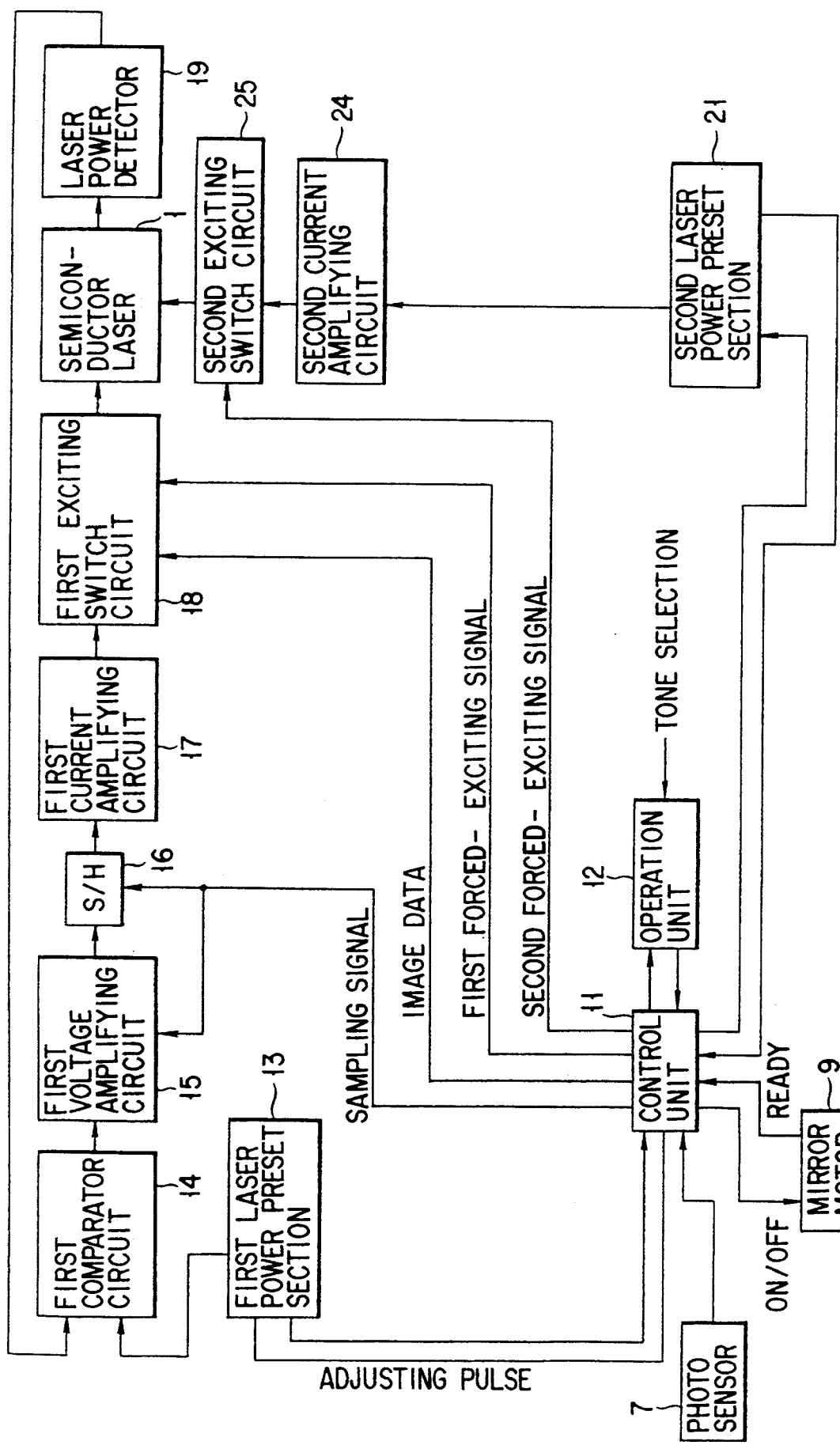
F I G. 10

EXPOSURE CONTROL DEVICE FOR USE IN ELECTROPHOTOGRAPHIC PRINTING APPARATUS

BACKGROUND OF THE INVENTION

1. Field of the Invention

The present invention relates to an exposure control device for use in an electrophotographic printing apparatus, such as a laser printer or a laser copying machine and, more particularly, to an exposure control device for controlling a laser light source for emitting a laser beam to expose a photosensitive image carrier.

2. Description of the Related Art

A typical electrophotographic printing apparatus will be described, taking, as an example, a laser printer equipped with a photosensitive drum serving as an image carrier. The laser printer uniformly charges the surface of a photosensitive drum rotating on a shaft in one direction and selectively exposes the charged surface of the drum by using a focused laser beam, thereby forming an electrostatic latent image on the photosensitive drum. The latent image is developed by supplying the photosensitive drum with a developer which selectively adheres to the latent image, so that a visible developer image is formed. The visible image is then transferred from the drum to paper. Such a laser printer is disclosed in the Japanese Unexamined Patent Disclosure Hei 1-234813.

The laser printer of this disclosure has a laser optical system for exposing the charged surface of the photosensitive drum. The optical system has a laser light source for emitting a laser beam. The laser beam is emitted to a polygon mirror rotated by a mirror motor, and then reflected on the polygon mirror to a predetermined scanning range. Each reflecting plane of the polygon mirror changes the direction of reflection of the incident laser beam according to its angle of rotation, thereby permitting the laser beam to scan the scanning range horizontally. The scanning range comprises an exposure area corresponding to the span of the drum surface and a non-exposure area outside the exposure area. A reflecting mirror receives the laser beam scanning the exposure area and reflects the received beam to the drum surface located therebelow. The drum surface is scanned by the laser beam in the direction of the main scanning which is parallel to the drum shaft. Further, the laser optical system has a pickup mirror and a photo sensor in order to identify a scanning position. The pickup mirror mirror is set at a position of the non-exposure area adjacent to the exposure starting end of the exposure area and reflects a laser beam reflected from the polygon mirror toward the photo sensor. The photo sensor converts the laser beam reflected from the pickup mirror to an electric signal.

The laser power of the laser beam, is preset by means of a laser control voltage to obtain a desired printing tone. However, the laser power may change, due to change in the temperature of the laser light source which depends on the frequency at which the laser sight source is driven. Therefore, the laser printer has a laser power detector formed in the laser light source, and corrects the driving current supplied to the laser light source based on the output voltage therefrom so that the laser power is stabilized at the preset level.

However, the above-described laser printer suffers from the following drawbacks because it must be controlled so that the laser power is kept constant all the time. Suppose that characters drawn by bold lines, such as Gothic characters, are printed. In this case, there is a fear that a slight increase of the printing tone makes the bold lines come in contact with each other and thus characters are defaced. In order to avoid such a situation, it is required to set the laser control voltage to 2 volts or less. However, the photo sensor cannot sense a laser beam with the laser power depending on such setting. In order to obtain the laser power of a laser beam which can be sensed with certainty, it is required to set the laser control voltage to 3V or more. If the laser printer is connected to a CAD (computer aided design) apparatus to draw precision graphic forms in accordance with image data therefrom, the laser control voltage must be set from 8V to 10V, in order to draw the graphic forms clearly. If, however, the laser control voltage are set to such a high voltage, the photo sensor will sense not only a laser beam reflected from a desired spot in the pickup mirror but also laser beams reflected from the periphery of the spot. This will cause the output signal of the photo sensor which should be rectangular in waveshape to become dull, resulting in a lag in the start timing of exposure.

SUMMARY OF THE INVENTION

It is an object of the present invention to provide an exposure control device for electrophotographic printing which permits the adjustable range of the laser power of a laser beam used for exposure to be extended without sacrificing the accuracy of the start timing of exposure.

The object of the present invention is attained by an exposure control device for electrophotographic printing which comprises a laser light source for generating a laser beam; a deflecting section for deflecting the laser beam from the laser light source so as to repeatedly scan a scanning range consisting of an exposure area and a non-exposure area external to the exposure area; a laser beam sensing section for sensing the laser beam falling on a reference position of the non-exposure area which is adjacent to the end of the exposure area at which exposure starts; and a light source controller for identifying, in response to a sense signal from the laser beam sensing section, the scanning start timings for the exposure area, the non-exposure area excluding a specified portion comprised of a reference position and the vicinity thereof, and the specified portion of the non-exposure area, driving the laser light source to intermittently generate a laser beam for exposure during the scan phase of the exposure area, to continuously generate a laser beam for exposure during the scan phase of the non-exposure area excluding the specified portion, and to continuously generate a laser beam for beam sensing during the scan phase of the specified portion.

According to the present invention, laser beams for scanning the exposure area and the specified portion of the non-exposure area are set to have independent laser power. For scanning of the specified portion, the laser power can be set properly according to the sensitivity of the laser beam sensing section. In this case, a time lag of the start timing of exposure can be prevented because the laser beam sensing section does not fail to sense the laser beam falling on the reference position. For scanning of the exposure area, the laser power can be set at a level outside the suitable range for the sensing operation of the laser beam sensing section so as to obtain a desired printing tone.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 10 illustrates a first modification of the laser control circuit of FIG. 3;

DETAILED DESCRIPTION OF THE PREFERRED EMBODIMENTS

Hereinafter, an electrophotographic printing apparatus according to an embodiment of the present invention will be described with reference to the accompanying drawings.

Figure 1:
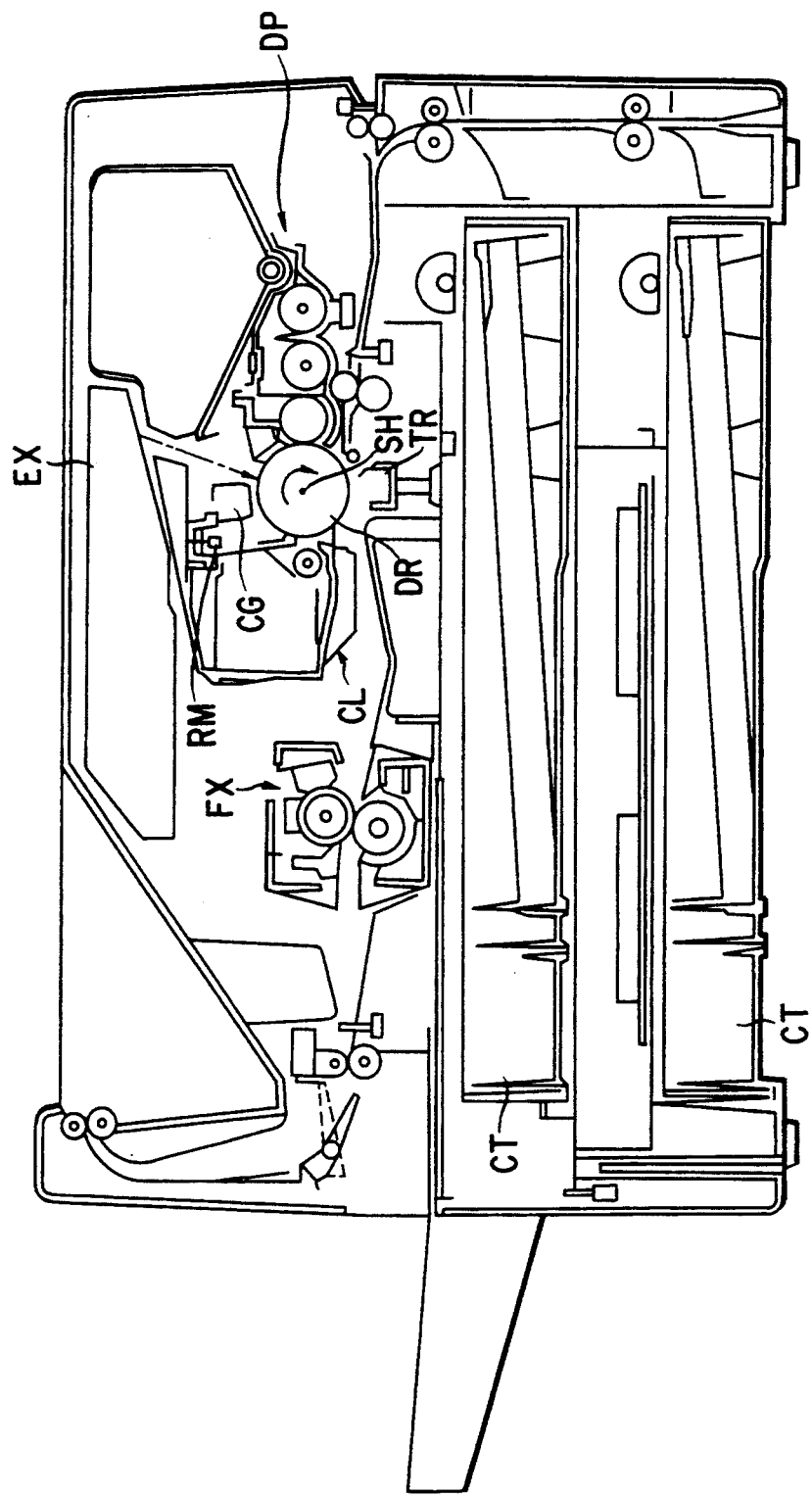
FIG. 1 is a schematic illustration of the internal structure of an electrophotographic printing apparatus according to an embodiment of the present invention.

FIG. 1 is a schematic illustration of the internal structure of the electrophotographic printing apparatus. The printing apparatus includes a photosensitive drum DR, a charging section CG, an exposing section EX, a developing section DP, a transferring section TR, a fixing section FX, a cleaning section CL and a deelectrifying section RM. The photosensitive drum DR is used as an image carrier and driven to rotate clockwise on a shaft SH. The charging section CG electrifies the surface of the drum uniformly. The exposing section EX selectively exposes the electrified surface of the photosensitive drum DR with a laser beam to form an electrostatic latent image on the photosensitive drum DR. The developing section DP supplies the photosensitive drum DR with a developer which selectively adheres to the electrostatic latent image, thereby developing the electrostatic latent image to a visible developer image. The transferring section TR transfers the developer image on the photosensitive drum DR onto paper fed from a paper feed cassette CT. The cleaning section CL removes unnecessary developer from the photosensitive drum DR after the transfer. The deelectrifying section RM removes unnecessary charges from the photosensitive drum DR. The fixing section FX applies heat and pressure to the paper fed from the transferring section TR, thereby to fix the transferred image to the paper.

Figure 2:
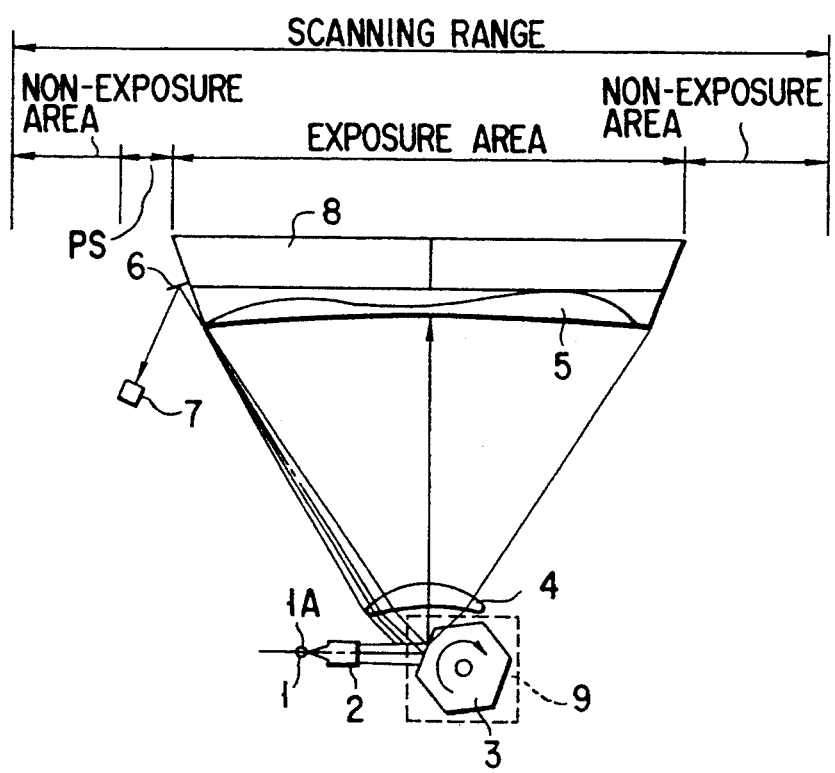
FIG. 2 illustrates a laser optical system of the electrophotographic printing apparatus of FIG. 1.

The exposing section EX has a laser optical system which is substantially the same as that in the prior art. FIG. 2 is a top view of the laser optical system. The laser optical system includes a semiconductor laser 1, a collimating lens 2, a polygon mirror 3, an aspherical lens 4, an aspherical toric lens 5, a pickup mirror 6, a photo sensor 7, a reflecting mirror 8 and a mirror motor 9. A laser beam emitted by the semiconductor laser 1 is expanded as an elliptical parallel beam by the collimating lens 2 and then reflected by the polygon mirror 3. The polygon mirror is rotated by the mirror motor 9 clockwise as indicated by an arrow. Each of the reflecting surfaces of the polygon mirror 3 changes the direction of reflection of the incident laser beam with a change of its angle of rotation, thereby scanning a predetermined scanning range horizontally. The scanning range is composed of an exposure area corresponding to the span of the surface of the photo sensitive drum DR and a non-exposure area outside the exposure area. The reflecting mirror 8 reflects a laser beam, which is reflected by the polygon mirror 3 and scans the exposure area through the aspherical lens 4 and the aspherical toric lens 5, on the surface of the photosensitive drum DR. The laser beam falls on the drum surface with its diameter in the range of 50 to 80 $\mu$m. The drum surface is scanned by the laser beam in the main-scanning direction parallel to the shaft SH. The aspherical lens 4 is used to correct variations in scanning speed corresponding to variations in angle of rotation of each reflecting surface of the polygon mirror 3, and the aspheric toric lens 5 is used to correct variations in angle of reflection due to the processing accuracy of the polygon mirror 3 (difference in verticality of its reflecting surfaces, in particular). In the laser optical system, the pickup mirror 6 and the photo sensor 7 are used to identify a scanning position. The pickup mirror 6 is placed at a position of the non-exposure area which is adjacent to the exposure starting end of the exposure area, and reflects the laser beam from the polygon mirror 3 toward the photo sensor 7. The photo sensor 7 receives the laser beam from the pickup mirror 6 and converts it to an electric pulse signal which serves as a horizontal sync signal.

Figure 3:
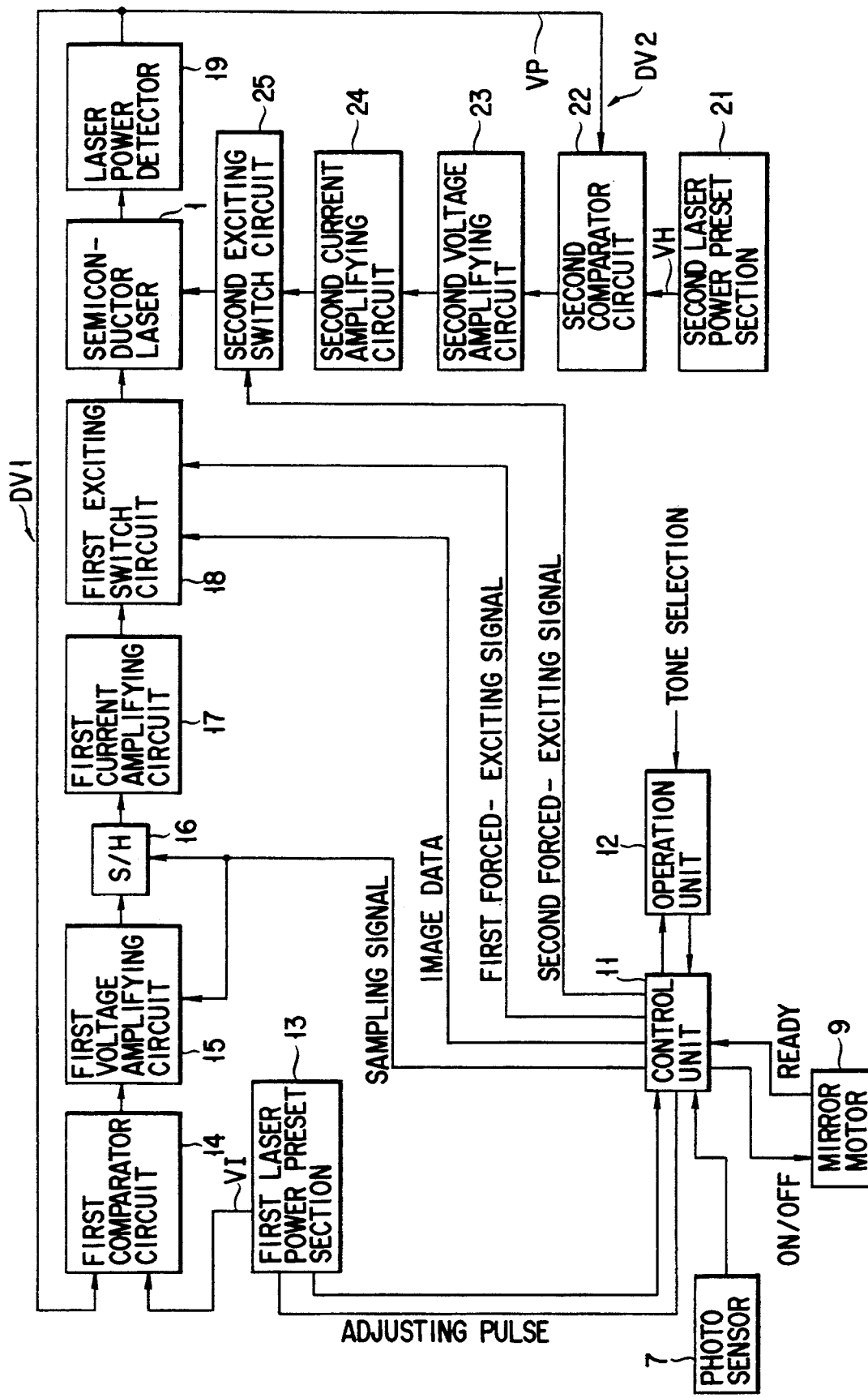
FIG. 3 is a schematic block diagram of the laser control circuit of the electrophotographic printing apparatus of FIG. 1.

The exposing section EX is further provided with a laser control circuit for controlling the semiconductor laser 1. FIG. 3 is a block diagram of the laser control circuit. The laser control circuit includes a control unit 11, an operation unit 12, a laser power detector 19 and first and second laser driving units DV1 and DV2. The control unit 11 may comprise a microprocessor for controlling the sequence of electrophotographic printing operations and producing image data and various control signals in the process of exposing the photosensitive drum DR. The control unit 11 precisely determines the timings for generating various control signals by using a built-in timer counter which operates in response to external signals. The operation unit 12 comprises various input keys, including a select key for selecting a printing tone prior to the print operation and a display panel for displaying operating conditions. The operation unit 12 produces tone data when the select key is operated, and enters the tone data into the control unit 11. The control unit 11 is connected to the photo sensor 7 to receive a horizontal sync signal and to the mirror motor 9 for drive control. The mirror motor 9 supplies a ready signal to the control unit when its rotation speed accelerated after the start of driving becomes stable at a predetermined level. The control unit 11 drives the mirror motor 9 prior to the initiation of exposure process and continues the driving until the exposure process is completed. The timing of the drive start is determined in due consideration of an acceleration time (about three to six seconds) of the motor 9 so that the rotation speed of the mirror motor 9 is stabilized when the photosensitive drum DR rotates to the angle at which the exposure is initiated. The laser power detector 19 receives a laser beam emitted by the semiconductor laser 1 and outputs an output voltage corresponding to the power of the received laser beam. The output voltage is applied to the laser driving units DV1 and DV2 as the measured voltage VP. The laser driving unit DV1 causes the semiconductor laser 1 to produce a laser beam having a power which permits suitable exposure of the photosensitive drum DR. The laser driving unit DV2 is used to cause the semiconductor laser 1 to produce a laser beam having power which permits the photo sensor 7 to perform a reliable sensing operation.

The laser driving unit DV1 comprises a laser power preset section 13, a comparator circuit 14, a voltage amplifying circuit 15, a sample and hold circuit 16, a current amplifying circuit 17 and a exciting switch circuit 18. The laser power preset section 14 produces a laser control voltage VI which serves the standard of the power of an exposing laser beam. The laser control voltage VI is adjusted by the control unit 11 so as to obtain a printing tone selected in the operation unit 12. For this adjustment, the control unit 11 applies to the laser power preset section 13 an adjust pulse signal which rises upon entry of tone data and receives from the laser power preset section 13 the laser control voltage VI which increases during the duration of the adjust pulse signal. The control unit 11 causes the adjust pulse signal to fall when the laser control voltage VI reaches a suitable level corresponding to the selected printing tone. The laser power preset section 13 thus sets the laser control voltage VI to a level corresponding to the duration of the adjust pulse signal. The comparator circuit 14 compares the laser control voltage VI from the laser power preset section 13 with the measured voltage VP from the laser power detector 19 and produces the difference voltage. The voltage amplifying circuit 15 applies to the sample and hold circuit 16 an output voltage set to the level corresponding to the difference voltage. The sample and hold circuit 16 is responsive to the rise of a sampling signal from the control unit 1 to sample the output voltage of the voltage amplifying circuit 15 and responsive to the fall of the sampling signal to hold the sampled voltage and outputs a current corresponding to the hold voltage. The output current of the sample and hold circuit 16 is amplified by the current amplifying circuit 17 and then applied to the exciting switch circuit 18. Under the control of the first forced-exciting signal and image data from the control unit 11, the exciting switch circuit 18 selectively supplies the semiconductor laser 1 with a driving current corresponding to the output current of the current amplifying circuit 17. The control unit 11, which identifies the scanning phase of the exposure area and the scanning phase of the non-exposure area on the basis of the horizontal sync signal, produces image data during a period of time required to scan the exposure area and subsequently produces the first forced-exciting signal continuously during a period of time required to scan the non-exposure area excluding the area PS. That is, the exciting switch circuit 18 intermittently outputs a driving current according to image data in order to obtain a laser beam for scanning the exposure area and continuously outputs a driving current upon application of the first forced-exciting signal in order to obtain a laser beam for scanning the non-exposure area excluding the area PS. For this reason, when scanning the exposure area and the non-exposure area excluding the area PS shown in FIG. 2, the semiconductor laser 1 produces laser beams having a common laser power depending on the output current of the current amplifying circuit 17. The sampling signal is set such that it rises at a time when the supply of the first forced-exciting signal is initiated and falls at a time when the supply of the first forced-exciting signal is stopped in order to perform sampling while the non-exposure areas excluding the area PS are scanned. The sampling signal is also supplied to the voltage amplifying circuit 15 as an output enable signal.

The laser driving section DV2 comprises a laser power preset section 21, a comparator circuit 22, a voltage amplifying circuit 23, a current amplifying circuit 24 and an exciting switch circuit 25. The laser power preset section 21 is used to produce a laser control voltage VH which serves as the reference power of a scanning position detecting laser beam. The laser control voltage VH is preset to a level suitable for the sense operation of the photo sensor 7 independently of the printing tone selected at the operation unit 12. The comparator circuit 22 makes a comparison between the laser control voltage VH supplied from the laser power preset section 21 and a measured voltage VP supplied from the laser power detector 19. Circuit 22 then produces an output current corresponding to the difference between the voltages. The output current is applied to the exciting switch circuit 25 via the current amplifying circuit 24. The exciting switch circuit 25 selectively supplies the semiconductor laser 1 with a driving current corresponding to the output current of the current amplifying circuit 24, under the control of the the second forced-exciting signal from the control unit 11. The control unit 11 produces the second forced-exciting signal continuously while the horizontal sync signal is not produced and during a predetermined period of time required to scan the area PS from when the supply of the first forced-exciting signal is stopped. That is, in order to obtain a laser beam for scanning the area PS, the exciting switch circuit 25 continuously outputs a driving current upon application of the second forced-exciting signal. For this reason, when scanning the area PS, the semiconductor laser 1 produces a laser beam of a power depending on the output current of the current amplifying circuit 24 which is provided independently of the current amplifying circuit 17.

Figure 4:
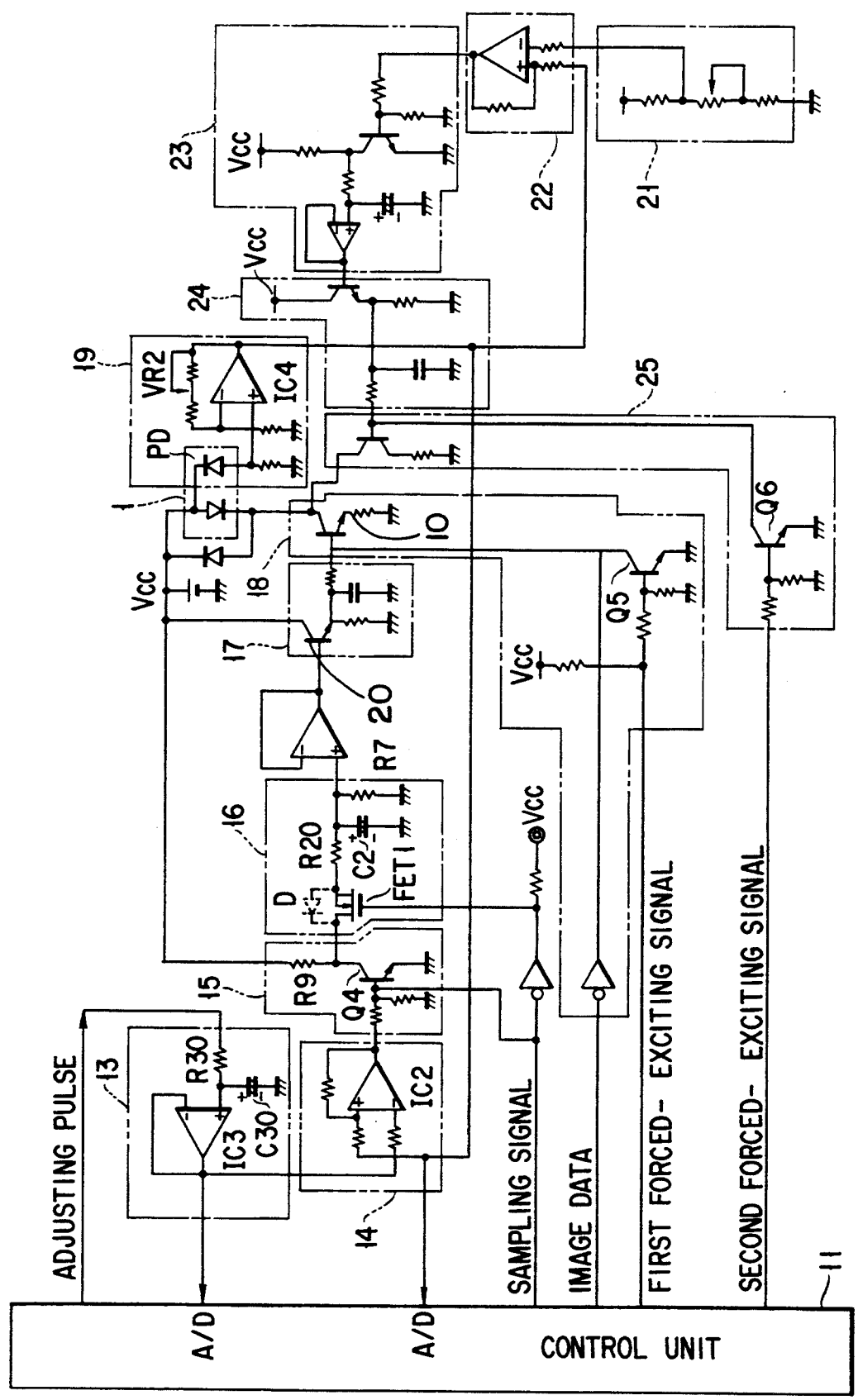
FIG. 4 is a detailed circuit diagram of the laser control circuit of FIG. 3.

FIG. 4 illustrates the arrangement of the laser control circuit in more detail. The laser power detector 19 comprises a photodiode PD incorporated into the semiconductor laser 1, an operational amplifier IC4 for amplifying an output signal of the photodiode PD and a variable resistor VR2 for compensating for variations in photoelectric conversion characteristic of the photodiode PD. The output voltage of the operational amplifier IC4 is applied to the first A/D (analog/digital) conversion terminal of the control unit 11 as measured voltage VP. The control unit 11 digitizes the measured voltage VP for verification. The laser power setting section 13 comprises a resistor R30 and a capacitor C30, which form an integrator for integrating an adjusting pulse from the control unit 11, and an operational amplifier IC3 for amplifying an output voltage of the integrator to produce the laser control voltage VI. The laser control voltage VI is applied to the comparator circuit 14 and the second A/D conversion input terminal of the control unit 11. The control unit 11 digitizes the laser control voltage VI and checks whether or not a suitable level corresponding to the selected printing tone has been reached. The comparator circuit 14 has an operational amplifier IC2 which makes a comparison between the laser control voltage VI from the operational amplifier IC3 and the measured voltage VP from the operational amplifier IC4 to produce a voltage corresponding to the difference therebetween. The voltage amplifying circuit 15 has a transistor Q4 for amplifying the output voltage of the operational amplifier IC2. The sample and hold circuit 16 comprises a MOS transistor FET1, a resistor R7, a resistor R20 and a capacitor C2. The transistor FET1 is turned on in response to the rise of a sampling signal from the control unit 11, during which time the capacitor C2 is charged up to a voltage corresponding to the output voltage of the voltage amplifying circuit 15. When the transistor FET1 is turned off in response to the fall of the sampling signal, the capacitor C2 outputs a current corresponding to the stored charges. The current amplifying circuit 17 has a transistor Q2 to amplify the output current of the capacitor C2, and the exciting switch circuit 18 has transistors Q1 and Q5 to switch the output of the transistor Q2. The drive current of the semiconductor laser 1 is corrected by the output current of the transistor Q2, thereby keeping the power of the laser beam substantially constant.

While the transistor FET1 of the sample and hold circuit 16 is superior to a mechanical relay or an analog switch in, for instance, size, cost and operating speed, the transistor has a parasitic diode D indicated as dotted in FIG. 4. The parasitic diode D would cause the stored charges in the capacitor C2 to leak through the transistor Q4 if the power of the laser beam were increased over a reference level. To prevent this, the sampling signal is applied to not only the gate of the transistor FET1 but also the base of the transistor Q4. Thus, the transistor Q4 will turn off in response to the fall of the sampling signal, thereby increasing its collector voltage. At this time, the parasitic diode D will become reverse-biased, thereby preventing the leakage of the stored charges in the capacitor C2.

The laser drive unit DV2 causes the semiconductor laser 1 to produce a laser beam with power which permits the photo sensor 7 to perform a certain sensing operation. Since the power of the laser beam is above the minimum level, which ensures the sense operation of the photo sensor 7, it is not necessary to maintain the laser power constant. Therefore, the laser drive unit DV2 does not have a sample and hold circuit as is provided in the laser drive unit DV1. Instead, the laser drive unit DV2 is arranged such that the measured voltage VP is continually fed from the laser power measuring section 19 back to the comparator circuit 22. If the laser drive unit DV2 were equipped with a sample and hold circuit, the non-exposure area would need to be broadened. The non-exposure area can be broadened by increasing the optical path length between the polygon mirror 3 and the photosensitive drum DR. However, this would make the electrophotographic printing apparatus larger.

Figure 5:
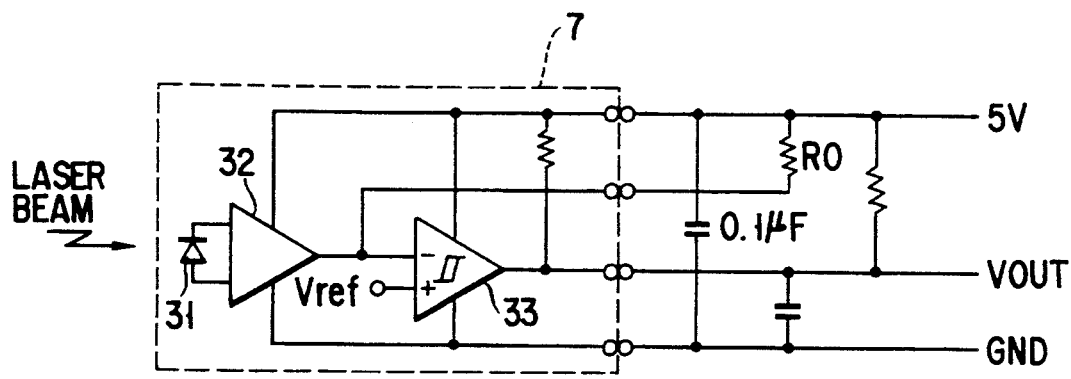
FIG. 5 illustrates an arrangement of the photo sensor of FIG. 3.
Figure 6:
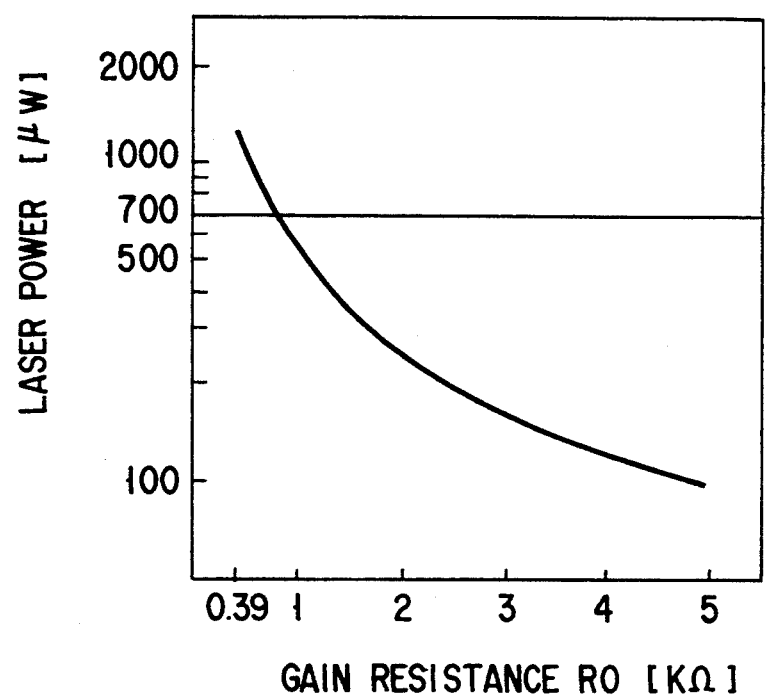
FIG. 6 is a graph illustrating a relationship between the resistance value of the resistor R0 and the laser beam power.

FIG. 5 illustrates an arrangement of the photo sensor 7, while FIG. 6 is a graph illustrating the relationship between the resistance of the resistor R0 in FIG. 5 and the laser power. The photo sensor 7 comprises a photodiode 31 for photoelectric conversion of a laser beam reflected by the pickup mirror 6 and operational amplifiers 32, 33 for amplifying an output signal of the photodiode 31. The amplification factor of the operational amplifiers 32, 33 is determined by a gain resistor R0. The resistance of the gain resistor R0 is set as small as possible so as to use the operational amplifiers 32 and 33 without saturation.

In this embodiment, the laser control voltage VI of the first laser power preset section 13 is variable in the range from 0 to 10V so that the output laser power may range from 0 to 5 mW. The laser control voltage VH of the second laser power preset section 21 is preset to $6V \pm 0.5V$ in order to obtain a laser power of the order of 3 mW. A laser beam with a power of, for example, 3 mW is attenuated to about 0.7 mW by passing through the aspherical lens 4 and the aspherical toric lens 5 after reflection from the polygon mirror 3 and then falls on the photo sensor 7. Therefore, from the relationship shown in FIG. 6, the gain resistance R0 is preset to a minimum resistance value. This value permits a laser beam of the order of 0.7 mW to be sensed.

Figure 7:
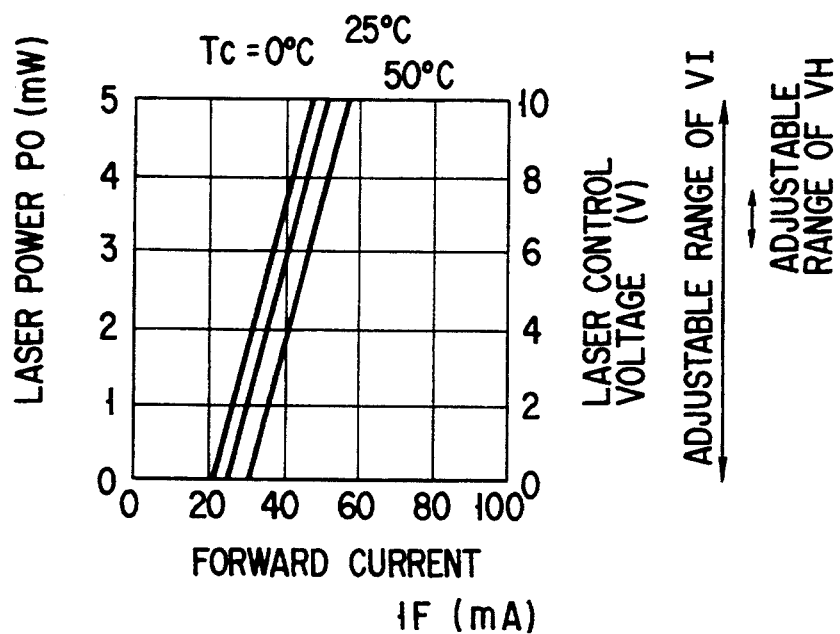
FIG. 7 is a graph illustrating a relationship between the laser power P0 of a laser beam generated by the semiconductor laser of FIG. 3 and the forward current (drive current) IF flowing through the semiconductor laser.

Next, a description will be made of the compensation for temperature-dependent variations of the laser power of the semiconductor laser 1. FIG. 7 illustrates laser power P0 versus forward current IF (drive current) for the semiconductor laser 1. Suppose now that the laser control voltage VI of the laser power preset section 13 is set to 6V in order to obtain 3-mW laser power. Upon receipt of the first forced-exciting signal from the control unit 11, the exciting switch circuit 18 causes a forward current IF to flow through the semiconductor laser 1. When the temperature of the semiconductor laser 1 is 25° C., a forward current IF of 40 mA flows through the semiconductor laser at VI=6V, so that a laser beam of 3 mW is produced from the semiconductor laser. If the temperature of the semiconductor laser rises to, for example, 50° C., however, a laser beam of 3 mW will not be produced from the semiconductor laser even if a forward current of 40 mA flows through the laser. In order to produce a laser beam of 3 mW, it is required to increase the forward current IF up to about 50 mA. Conversely, if the temperature of the semiconductor laser falls to, for example, 0° C., it will be required to decrease the forward current IF.

As described above, when the semiconductor laser 1 produces a laser beam, the laser power detector 19 generates a measured voltage VP proportional to the laser beam power. The measured voltage VP is compared with the laser control voltage VI in the comparator circuit 14 and the comparator circuit output voltage is amplified by the voltage amplifying circuit 15. The sample and hold circuit 16 samples the output voltage in response to the rise of the sampling signal and holds the voltage sample in response to the fall of the sampling signal, thereby outputting a current corresponding to the hold voltage. The output current of the sample and hold circuit 16 is amplified by the current amplifying circuit 17 for subsequent application to the exciting switch circuit 18. The exciting switch circuit 18 permits a drive current corresponding to the output current of the current amplifying circuit to flow through the semiconductor laser 1.

The output voltage of the voltage amplifying circuit 15 varies in a direction that increases the drive current flowing through the semiconductor laser 1 when the temperature of the semiconductor laser rises and in the direction that decreases the drive current when the temperature of the semiconductor laser falls. That is, the laser power measuring section 19, the comparator circuit 14, the voltage amplifying circuit 15, the sample and hold circuit 16, the current amplifying circuit 17 and the exciting switch circuit 18, together constitute a feedback system which maintains the power of a laser beam generated by the semiconductor laser 1 at a level corresponding to the laser control voltage VI set by the laser power preset section 13. In this embodiment, since the sampling signal is produced simultaneously with the first forced-exciting signal, the feedback system corrects the drive current of the semiconductor laser with each horizontal scan.

Figure 8:
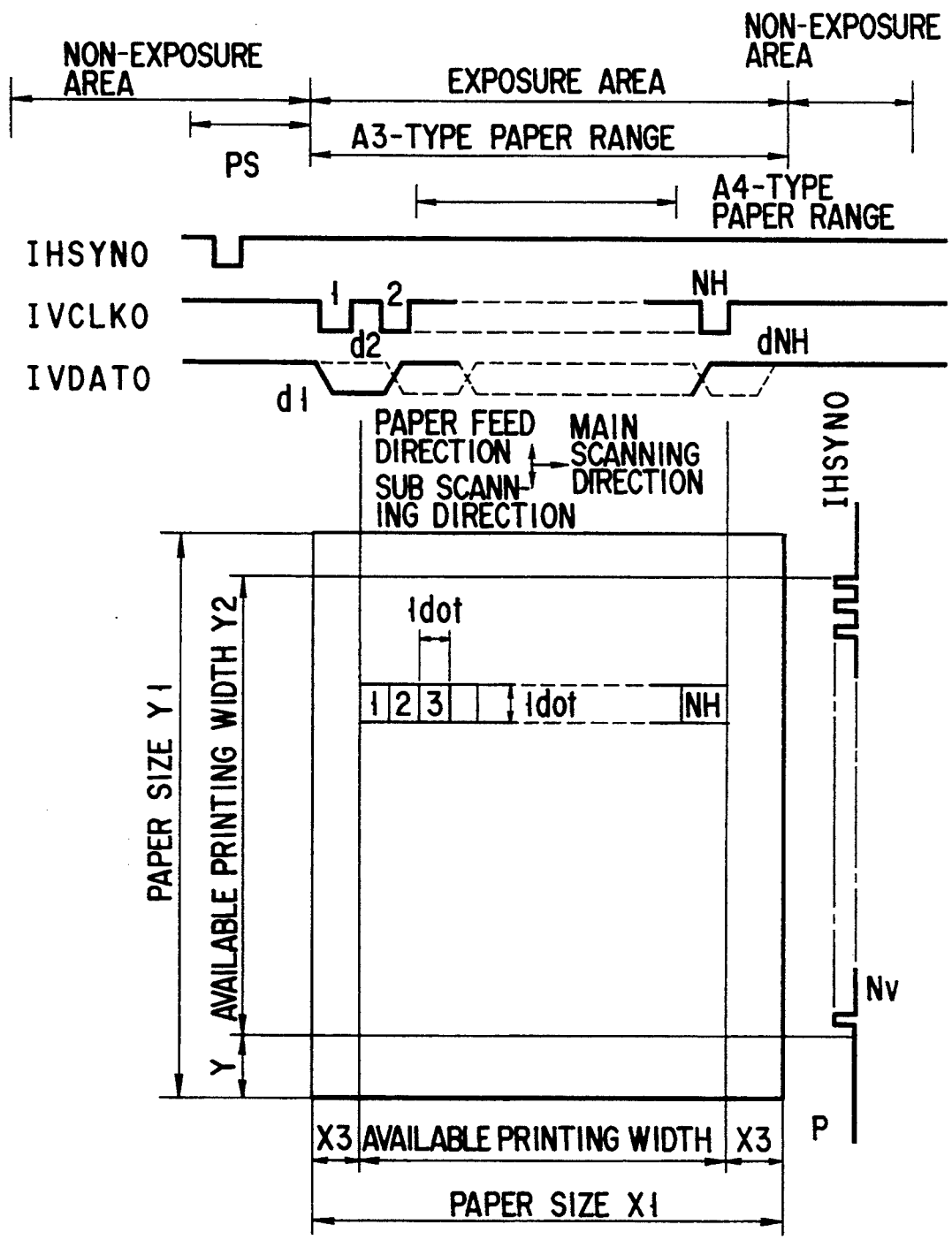
FIG. 8 is a diagram for use in explanation of the scanning directions and the print area of paper P.

FIG. 8 illustrates a relation between the scanning direction and the print area of paper P. In the figure, the non-exposure area and the exposure area are the same as those shown in FIG. 2 and they are subjected to horizontal scan repeatedly by rotation of the polygon mirror 3. In each horizontal scan, when a laser beam scans the area PS, a horizontal sync signal IHSYNO is produced. The control unit 11 generates timing clocks IVCLO inside in response to the horizontal sync signal IHSYNO and image data IVDATO synchronously with the timing clocks. The image data is applied to the exciting switch circuit 18 and used to generate a laser beam intermittently when the exposure area is scanned. As a result of this scanning, a line of dots is printed in the main scanning direction on paper P. In the main direction, the maximum print area is limited by the available print width X2 corresponding to the paper size X1. In order to print each line of dots, the paper P is moved a predetermined quantity in the paper feeding direction. In this way, two or more lines of dots are printed, one under the other, in the sub-scanning direction on the paper P. The maximum print area in the subscanning direction is limited by the available print width Y2 corresponding to the paper size Y1.

Suppose that the user changes the printing tone while printing is being made. In this case, since several seconds are required to adjust the laser control voltage VI, the printing tone will be changed only by a fixed level each time a line of dots is printed. In contrast with this, since there is no such a constraint on variations in printing tone dependent on the temperature of the semiconductor laser 1, printing of only one line of dots will permit the printing tone to be changed. As an example, with an electrophotographic printing apparatus which can print eight sheets of A4-size paper per minute with a resolution of 400 dots per inch, the printing tone will be changed in about 1 mS.

Next, the control operation of the laser control circuit will be described with reference to FIG. 9, which is a timing diagram of signals generated for the control operation.

When the printing starts, the control unit 11 rotates the polygon mirror 9 and continuously supplies the second forced-exciting signal to the exciting switch circuit 25. In response to the second forced-exciting signal the exciting switch circuit 25 supplies the semiconductor laser 1 with a drive current, thus permitting the laser to generate a laser beam. The laser beam is deflected by the polygon mirror 3, driven by the mirror motor 9, to repeat the horizontal scanning of the scanning range. After a preset laser power is reached, the photo sensor 7 produces a horizontal sync signal each time the scan position of the laser beam coincides with the pickup mirror 6. The control unit 11 stops the supply of the second forced-exciting signal in response to the horizontal sync signal from the photo sensor 7 and then waits for the lapse of the scan period for the exposure area. The control unit 11 continuously supplies the first forced-exciting signal to the exciting switch circuit 18 only during the scan period for the non-exposure area, exclusive of the area PS, from the time when the scan period for the exposure area elapses, and continuously supplies the second forced-exciting signal to the exciting switch circuit 25 from the time when the scan period for the non-exposure area elapses. The exciting switch circuit 18 drives the semiconductor laser 1 with a drive current corresponding to the laser control voltage VI, while the exciting switch circuit 25 drives the semiconductor laser with a drive current corresponding to the laser control voltage VH. (The laser control voltages VI and VH used here are adjusted prior to the start of printing.) The laser control voltage VH is always preset to 6V, which is suited to generate the horizontal sync signal, while the laser control voltage VI is preset to 2V, which is suited to print Gothic letters, for example.) The interval at which the horizontal sync signal is produced becomes shorter as the mirror motor 9 is accelerated, during which time there is a time lag between the timing of supply of the first and second forced-exciting signals and their proper timing. However, since the supply of the second forced-exciting signal is continued until the next horizontal sync signal is generated, the semiconductor laser always generates the laser beam for scanning the area PS on the basis of the drive current supplied from the exciting switch circuit 25. The drive current is set to a level suitable for detection of the scan position and corresponding to the laser control voltage VH. Therefore, the generation of the horizontal sync signal is repeated surely. The control unit 11 does not start the generation of image data until the rotation speed of the mirror motor 9 reaches a predetermined speed.

When the rotation speed of the mirror motor 9 becomes stable, the mirror motor 9 supplies a ready signal READY to the control unit 11. Upon receipt of the ready signal READY, the control unit 11 regards the preparation of exposure as being completed, stops the supply of the second forced-exciting signal in response to a horizontal sync signal from the photo sensor 7, and continuously produces image data by the scan period for the exposure area from the time when the supply of the second forced-exciting signal is stopped. Moreover, the control unit continuously supplies the first forced-exciting signal to the exciting switch circuit 18 by the scan period for the non-exposure area, excluding the area PS, from the time when the scan period for exposure area elapses, and continuously supplies the second forced-exciting signal to the exciting switch circuit 25 from the time when the scan period for the non-exposure area, excluding area PS, elapses. The time interval at which the horizontal sync signal is generated becomes uniform as the rotation speed of the mirror motor 9 becomes stable. Consequently, the first and second forced-exciting signals are applied to the exciting switch circuits 18 and 25, respectively, at their respective proper times. The sampling signal is the same as the first forced-exciting signal in waveform, and, thus, the sampling operation of the sample and hold circuit 16 is performed at the proper times.

Consider here that a need to increase the printing tone arises during the exposure. The laser control voltage VI (=2V) is changed in several seconds to a level higher than the laser control voltage VH (=6 V). With the horizontal scanning during this period, the changing laser control voltage VI' and the laser control voltage VH are used alternately. That is, the area PS is always scanned by a laser beam with a power corresponding to the laser control voltage VH, even if the laser control voltage VI is being changed.

With the embodiment described above, the semiconductor laser 1 generates laser beams with two different levels of laser power for scanning of the scanning range. The first laser power is used to scan the area PS in which the pickup mirror 6 is placed, and obtained when the semiconductor laser 1 is driven by a drive current corresponding to the laser control voltage VH of the laser power preset section 21. The second laser power is used to scan the non-exposure area excluding the area PS and the exposure area and obtained when the semiconductor laser is driven by a drive current corresponding to the laser control voltage VI. The first laser power can be set to a level which permits the photo sensor 7 to properly sense the laser beam reflected from the pickup mirror 6. For this reason, the time lag of the timing of the initiating of the exposure can be prevented. The second laser power can be set to a level which, though not suitable for the sense operation of the photo sensor 7, permits the photosensitive drum to be exposed adequately for a desired printing tone.

Thereby, the printing tone can be lowered in order to prevent the defacement of printed Gothic letters or the printing tone can be increased in order to print fine graphics output from a CAD device clearly without taking the sense operation of the photo sensor 7 into account. In addition, the semiconductor laser continuously generates a laser beam with the second laser power during the scan period for the non-exposure area excluding the area PS. The second laser power may deviate from a level suitable for exposure because of the temperature change of the semiconductor laser. The actual deviation can be detected during the scan period for the non-exposure area excluding the area PS, thus permitting the drive current of the semiconductor laser to be properly corrected.

In the present embodiment, the capacitor C2 of the sample and hold circuit 16 is charged by an output voltage of the voltage amplifying circuit 15 when the MOS transistor FET1 is conductive and the output voltage is held by the transistor being turned off in response to the fall of the sampling signal. If the capacitor C2 became leaky, the actual printing tone would be lower than from a preset level.

However, since the sampling signal is applied not only to the gate of the MOS transistor FET1 of the sample and hold circuit 16, but also to the base of the transistor Q4 of the voltage amplifying circuit 15, the transistor Q4 and the MOS transistor FET1 are turned off simultaneously. When the transistor Q4 is turned off, the voltage amplifying circuit 15 is electrically isolated from the sample and hold circuit 16, so that the parasitic diode D of the MOS transistor FET1 is reverse-biased. Thus, the parasitic diode D will not leak any charge on the capacitor C2, preventing the printing tone from lowering.

FIG. 10 illustrates a first modification of the laser control circuit shown in FIG. 3. In this modification, the comparator circuit 22 and the voltage amplifying circuit 23 are not provided in the laser drive unit DV2. The laser power preset section 21 is arranged to set the laser control voltage VH corresponding to the duration of an adjusting pulse signal supplied from the control unit 11. The laser power preset section 21, like the laser power preset section 13, has an integrator which integrates the adjusting pulse signal, to obtain a direct current signal. The direct current signal is applied to the exciting switch circuit 25 via the current amplifying circuit 24. According to the modification, the laser control voltage VH can be adjusted using input data from the operation unit 20. Note that the laser control voltage VH must be adjusted within a range of levels suitable for the sense operation of the photo sensor 7.

Figure 11:
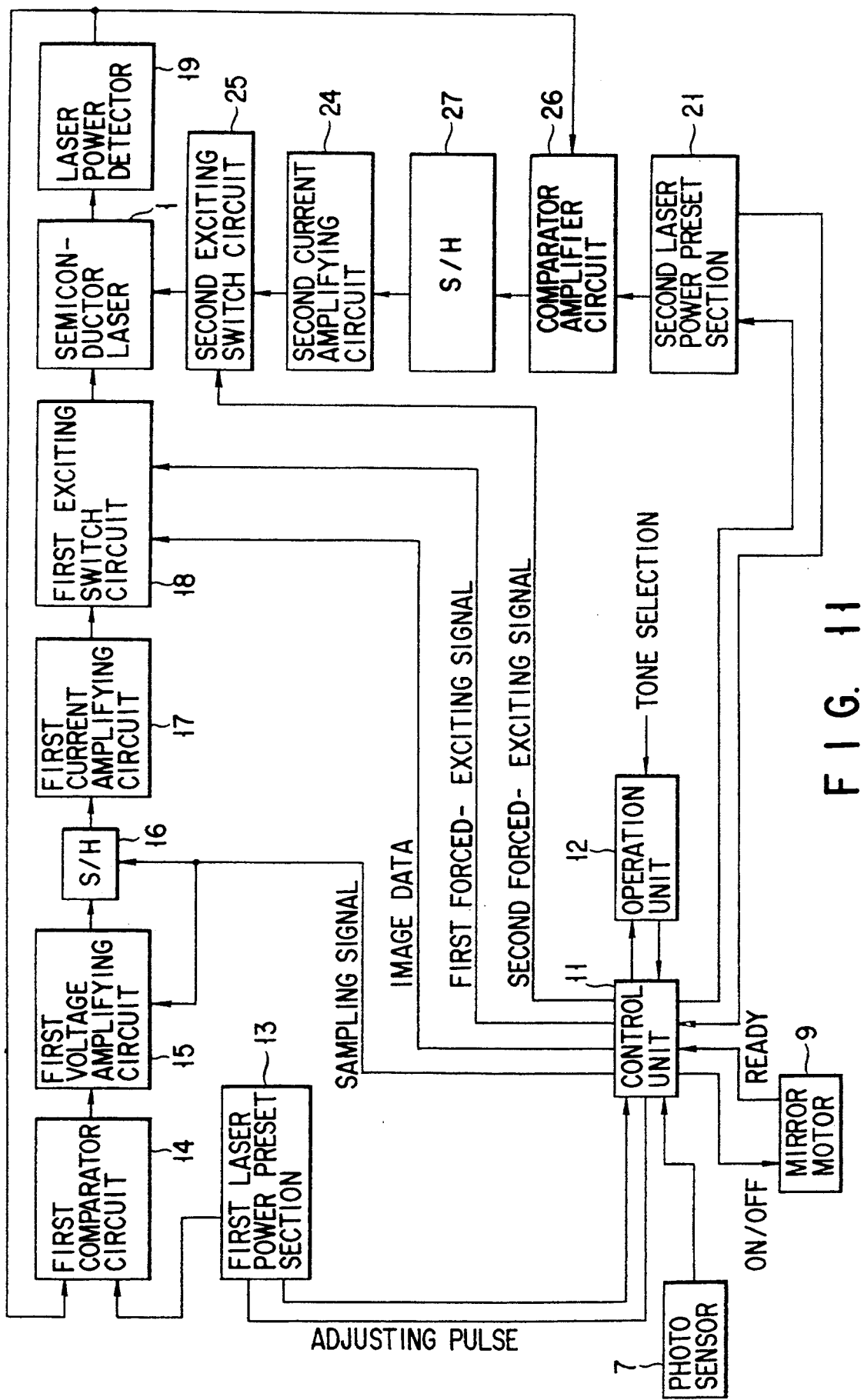
FIG. 11 illustrates a second modification of the laser control circuit of FIG. 3.

FIG. 11 illustrates a second modification of the laser control circuit shown in FIG. 3. This modification includes a comparator/amplifier circuit 26 and a sample and hold circuit 27, in addition to the laser power preset circuit 21 used in the modification of FIG. 10. The comparator/amplifier circuit 26 makes a comparison between the laser control voltage VH, from the laser power preset section 21 and the measured voltage VP from the laser power measuring section 19 and amplifies a difference voltage therebetween. The sample and hold circuit 27 samples the output voltage from the comparator/amplifier circuit 26 in response to the rise of a second sampling signal supplied from the control unit 11 and holds a voltage sample in response to the fall of the second sampling signal. If the operation of the sample and hold circuit 27 is performed with each horizontal scan, the sampling signal may have the same waveform as the second forced-exciting signal.

According to the second modification, by detecting the deviation of the laser power of the laser beam for scanning the area PS resulting from the temperature change of the semiconductor laser, the drive current of the semiconductor laser can be corrected properly. That is, the horizontal sync signal can be generated more surely. Incidentally, since the temperature of the semiconductor laser does not change considerably while one page is printed, no inconvenience occurs even if the second sampling signal is altered such that the operation of the sample and hold circuit 27 is performed only at the time of the first horizontal scan of each page.

Figure 12:
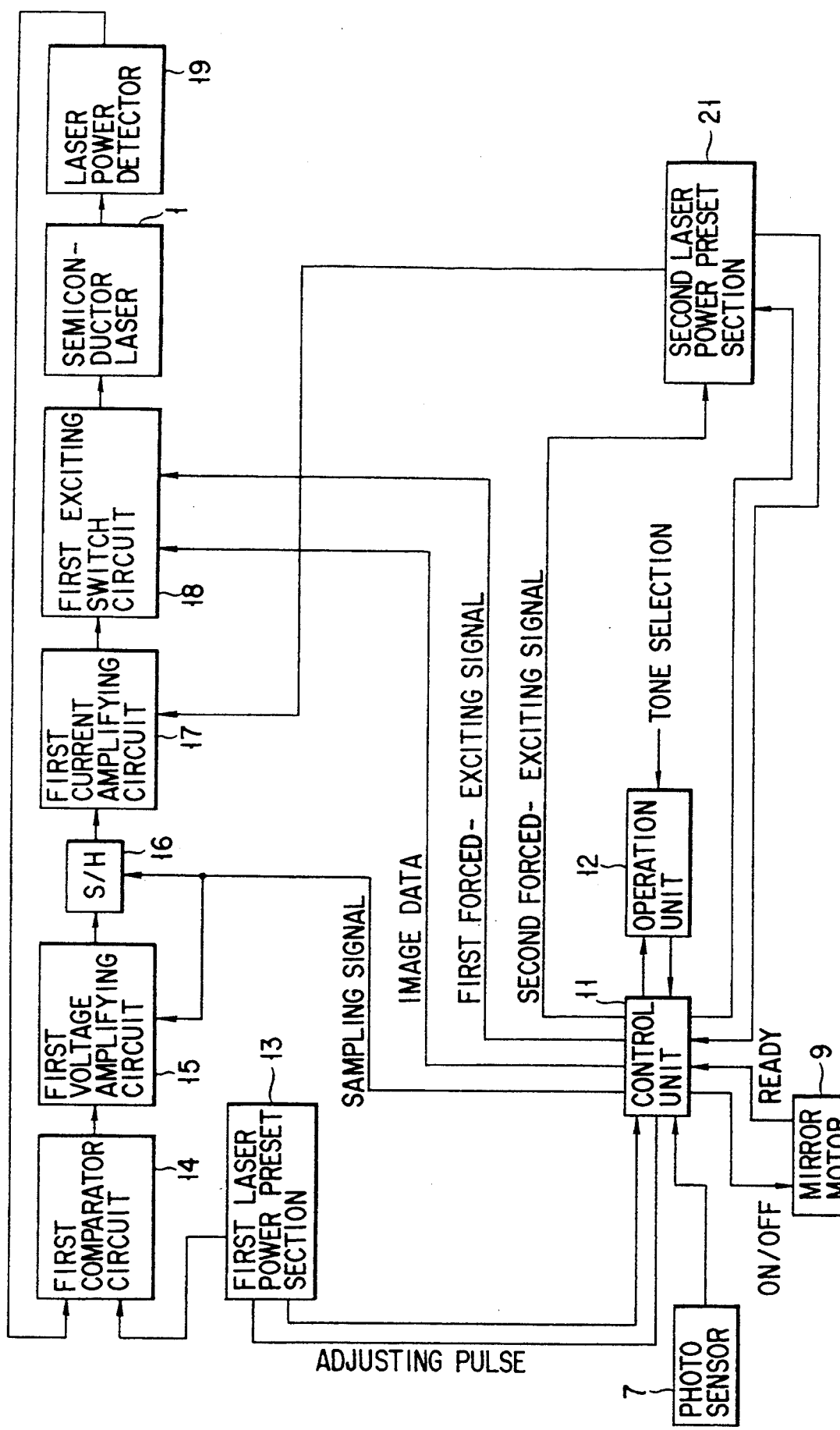
FIG. 12 illustrates a third modification of the laser control circuit of FIG. 3.

FIG. 12 illustrates a third modification of the laser control circuit of FIG. 3. In this modification, the laser drive unit DV2 has only the laser power preset section 21 used in the modification of FIG. 10. The integrator circuit of the laser power preset section 21 supplies a direct current signal resulting from integration of the adjusting pulse signal to the current amplifying circuit 17. However, the laser power preset section 21 is arranged to supply the output signal of the integrator to the current amplifying circuit 17 only during a time period when the second forced-exciting signal is supplied. This modified laser control circuit is less complex than the laser control circuit shown in FIG. 3 because there is no need of the comparator circuit 22, voltage amplifying circuit 23, current amplifying circuit 24 and the exciting switch circuit 25.

Although the preferred embodiments of the present invention have been disclosed and described, it is apparent that other embodiments and modifications are possible.

For example, the semiconductor laser may be driven after the rotation speed of the mirror motor has been stabilized instead of being driven immediately after the start of rotation of the mirror motor. This can lengthen the life of the semiconductor laser used.

Moreover, in order to adjust the laser optical system, the laser control circuit may have an adjust mode in which the laser control unit 11 rotates the mirror motor 9 in response to activation of a key on the operation unit 20, drives the semiconductor laser with a second forced-exciting signal and lights light emitting devices of a display in response to a horizontal sync signal supplied from the photo sensor 7 each time it receives a laser beam from the semiconductor laser.

Furthermore, consider an electrophotographic printing apparatus which is arranged to select among resolutions of 300 dots per inch, 400 dots per inch and 600 dots per inch by activation of a key on the operation unit 20. When A4-size paper is printed at a rate of eight sheets per minute, the laser beam scanning speed is set to about 243 mm per second for a resolution of 300 dots per inch, 324 mm per second for a resolution of 400 dots per inch and 486 mm per second for a resolution of 600 dots per inch. That is, as the resolution becomes higher, the laser beam scanning speed is set higher.

The laser control circuit of that type of electrophotographic printing apparatus increases the laser control voltage VH with an increase in the resolution to thereby make the amount of light per a unit time received by the photo sensor proper. That is, the laser control voltage VH is set to 6V for a first resolution of 300 dots per inch, 8V for a second resolution of 400 dots per inch and 10V for a third resolution of 600 dots per inch. The laser control voltage VH for the third resolution is not twice, but about 1.6 times as high as, that for the first resolution. The reason is to prevent the laser output from exceeding a maximum rating of 5 mW of the semiconductor laser. The laser control voltage is determined on the basis of the characteristics shown in FIG. 7. In the case where the laser control voltage VH is adjusted as described above, the horizontal sync signal can be properly obtained even if the resolution is changed.

The laser control circuit may be arranged to increase the laser control voltage VI with an increase in the resolution. This will prevent the quality of printed images from depending on resolutions, thus permitting uniform image quality to be obtained.

Figure 9:
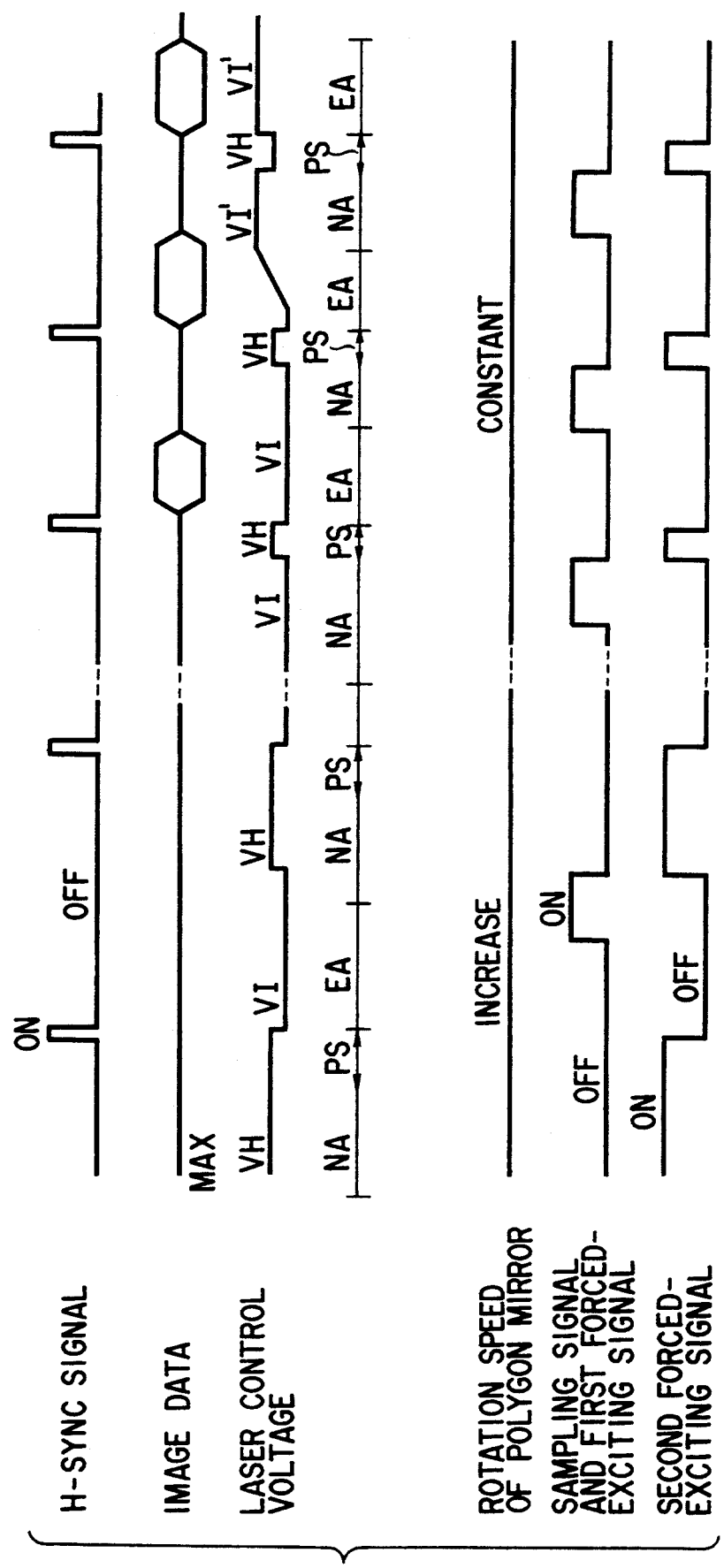
FIG. 9 is a timing diagram of signals developed by the laser control circuit of FIG. 3.

In addition, the laser control circuit can also be arranged to change the ratio of the duration of the sampling signal to the duration of the second forced-exciting signal, which are shown in FIG. 9, so that a sampling time suitable for the resolution used is obtained. That is, the sampling time is set long in the case where the scanning speed increases with increasing resolution. This makes it possible to cope with plural resolutions, without changing values of the resistors R20 and R7 and the capacitor C3 of the sample or hold circuit 16.

Furthermore, the laser control circuit can also be arranged to set the laser control voltages VI and VH in accordance with, not only the integrator outputs supplied from the laser power preset sections 13 and 21 to the control unit 11 but also, the measured voltage VP supplied from the laser power detector 19 to the control unit. This will makes it possible to compensate for variations in output characteristics of the semiconductor laser 1. In this case, it is required to perform this control within an operate time of one millisecond required by the semiconductor laser 1 when A4-size paper is printed at a rate of eight sheets per minute. The processing speed of existing microprocessors is fast enough. Thus a microprocessor having a one-instruction execution time of the order of one microsecond can be used for this control.

What is claimed is:

1. An exposure control device for electrophotographic printing, comprising:
   means for generating a laser beam;
   means for guiding the laser beam from said generating means to repeatedly scan a scanning range constituted by an exposure area and a non-exposure area external to the exposure area, thereby producing a latent image having image densities;
   sensing means, having a predetermined sensitivity range responsive to a laser beam falling within the predetermined sensitivity range for sensing the laser beam directed to a reference position of the non-exposure area to provide a sense signal;
   means for controlling said generating means to synchronize a timing of a scanning start for the exposure area with the sense signal provided by said sensing means;
   means for energizing said generating means to generate the laser beam having a first laser power while said guiding means guides the laser beam to the exposure area and having a second laser power while said guiding means guides the laser beam to the reference position of the non-exposure area;
   first setting means for setting a first laser control signal serving as a reference for the first laser power which represents one of the available image densities of said latent image;
   second setting means for setting a second laser control signal serving as another reference for the second laser power which is independent of the first laser power, said second laser control signal corresponding to a value falling within the predetermined sensitivity range of said sensing means; and
   means for driving said generating means based on the first and second laser control signals respectively set by said first and second setting means.

2. The exposure control device according to claim 1, further comprising:
   means for continuously generating image data during a scan phase of the exposure area;
   means for continuously generating a first forced-exciting signal during a scan phase of the non-exposure area excluding a specified portion composed of the reference position and the vicinity thereof; and
   first supplying means for supplying a first drive current during a period in which the image data and the first forced-exciting signal are generated.

3. The exposure control device according to claim 2, wherein said energizing means includes means for generating an output voltage corresponding to the power of the laser beam generated by said laser beam generating means as a measured voltage, said first supplying means including means for comparing the first laser control voltage and the measured voltage to generate an output voltage corresponding to a difference therebetween, means for sampling and holding the output voltage obtained from said comparing means when the non-exposure area excluding the specified portion is scanned by the laser beam of the first laser power, and means for exciting said laser beam generating means by setting the first drive current according to the output current of said sampling and holding means so as to provide the first drive current under the control of the image data and the first forced exciting signal.

4. The exposure control device according to claim 3, further comprising:

means for generating a sampling signal during the scan phase of the non-exposure area excluding the specified portion, wherein said sampling and holding means includes a MOS transistor which turns on upon supply of the sampling signal to sample the output voltage of said comparing means and turns off upon stop of the sampling signal supply to hold the sampled voltage, and said comparing means includes an output transistor which turns on upon supply of the sampling signal to output the output voltage of said comparing means and turns off upon stop of the sampling signal supply to electrically separate said comparing means from said sampling and holding means.

5. The exposure control device according to claim 4, further comprising means for generating a second forced-exciting signal during the scan phase of the specified portion; and wherein said driving means includes second supplying means for supplying a second drive current during the period in which the second forced-exciting signal is generated.

6. The exposure control device according to claim 5, wherein said second supplying means includes means for exciting said laser beam generating means by setting the first drive current according to the second laser control voltage so as to provide the second drive current to said laser beam generating means under the control of the second forced-exciting signal.

7. The exposure control device according to claim 1, further comprising:

means for continuously generating the image data during the scan phase of the exposure area;

means for continuously generating a first forced exciting signal during a scan phase of the non-exposure area excluding a specified portion composed of the reference position and the vicinity thereof, and continuously generating a second forced-exciting signal during the scan phase of the specified portion; and means for generating an output voltage corresponding to the power of the laser beam generated by said laser beam generating means as a measured voltage, wherein said second laser control voltage setting means is arranged to output the second laser control voltage under the control of the second forced-exciting signal, said driving means includes means for comparing the first laser control voltage and the measured voltage to generate an output voltage corresponding to a difference therebetween, means for sampling and holding the output voltage obtained from said comparing means when the non-exposure area excluding the specified portion is scanned by the laser beam of the first laser power, and means for exciting said laser beam generating means by setting a first drive current according to the output current of said sampling and holding means and supplying the first drive current to the laser beam generating means under the control of the image data and the first forced-exciting signal, and by setting a second drive current according to the second laser control voltage and supplying the second drive current to the laser beam generating means when neither the image data nor the first forced-exciting signal is supplied.

8. The exposure control device according to claim 7, wherein said energizing means further includes means for inputting data to said operation controlling means, and said operation controlling means includes means for adjusting at least one of the first and second laser control voltages based on the data input by said inputting means.

9. An electrophotographic printing apparatus including:

a photosensitive image carrier;

charging means for uniformly electrifying a surface of said image carrier;

exposing means for selectively exposing the electrified surface of said image carrier with a laser beam to form an electrostatic latent image on the electrified surface, and developing means for supplying said image carrier with a developer which selectively adheres to the electrostatic latent image, thereby developing the electrostatic latent image so as to be a visible developed image to be transferred to a sheet of paper, said apparatus comprising means for generating a laser beam;

means for guiding the laser beam from said generating means to repeatedly scan a scanning range constituted by an exposure area and a non-exposure area external to the exposure area, thereby producing a latent image having any of available image densities;

sensing means having a predetermined sensitivity range and responsive to a laser beam intensity falling within the predetermined sensitivity range, for sensing the laser beam directed to a reference position of the non-exposure area to provide a sense signal;

means for controlling said generating means to synchronize a timing of a scanning start for the exposure area with the sense signal provided by said sensing means;

means for energizing said generating means to generate the laser beam having a first laser power while said guiding means guides the laser beam to the exposure area, and having a second laser power while said guiding means guides the laser beam to the reference position of the non-exposure area;

first setting means setting a first laser control signal serving as a reference for the first laser power which represents one of the available image densities of said latent image;

second setting means for setting a second laser control signal serving as another reference for the second laser power which is independent of the first laser power, said second laser control signal corresponding to a value falling within the predetermined sensitivity range of said sensing means; and means for driving said generating means based on the first and second laser control signals set by said first and second setting means.

10. The electrophotographic printing apparatus according to claim 9, wherein said operation controlling means includes means for continuously generating a first forced-exciting signal during a scan phase of the non-exposure area excluding a specified portion composed of the reference position and the vicinity thereof, and first supplying means for supplying a first drive current during a period in which the image data and the first forced-exciting signal are generated.

11. The electrophotographic printing apparatus according to claim 10, wherein said energizing means includes means for generating an output voltage corresponding to the power of the laser beam generated by said laser beam generating means as a measured voltage, said first supplying means includes means for comparing the first laser control voltage and the measured voltage to generate an output voltage corresponding to a difference ence therebetween, means for sampling and holding the output voltage obtained from said comparing means when the non-exposure area excluding the specified portion is scanned by the laser beam of the first laser power, and means for exciting said laser beam generating means by setting the first drive current according to the output current of said sampling and holding means so as to provide the first drive current under the control of the image data and the first forced-exciting signal.

12. The electrophotographic printing apparatus according to claim 11, further comprising:

means for generating a sampling signal during the scan phase of the non-exposure area excluding the specified portion, wherein said sampling and holding means includes a MOS transistor which turns on upon supply of the sampling signal to sample the output voltage of said comparing means and turns off upon stop of the sampling signal supply to hold the sampled voltage, and said comparing means includes an output transistor which turns on upon supply of the sampling signal to output the output voltage of said comparing means and turns off upon stop of the sampling signal supply to electrically separate said comparing means from said sampling and holding means.

13. The electrophotographic printing apparatus according to claim 12, said operation controlling means further comprising means for generating a second forced-exciting signal during the scan phase of the specified portion, and said driving means includes second supplying means for supplying a second drive current during the period in which the second forced-exciting signal is generated.

14. The electrophotographic printing apparatus according to claim 13, wherein said second supplying means includes means for exciting said laser beam generating means by setting the first drive current according to the second laser control voltage so as to provide the second drive current to said laser beam generating means under the control of the second forced-exciting signal.

15. The electrophotographic printing apparatus according to claim 9, wherein said operation controlling means includes means for continuously generating a first forced-exciting signal during the scan phase of the non-exposure area excluding a specified portion composed of the reference position and the vicinity thereof, and continuously generating a second forced-exciting signal during the scan phase of the specified portion; means for generating an output voltage corresponding to the power of the laser beam generated by said laser beam generating means as a measured voltage, said second laser control voltage setting means is arranged to output the second laser control voltage under the control of the second forced-exciting signal, said driving means includes means for comparing the first laser control voltage and the measured voltage to generate an output voltage corresponding to a difference therebetween, means for sampling and holding the output voltage obtained from said comparing means when the non-exposure area excluding the specified portion is scanned by the laser beam of the first laser power, and means for exciting said laser beam generating means by setting a first drive current according to the output current of said sampling and holding means and supplying the first drive current to the laser beam generating means under the control of the image data and the first forced-exciting signal, and by setting a second drive current according to the second laser control voltage and supplying the second drive current to the laser beam generating means when neither the image data nor the first forced-exciting signal is supplied.

16. The electrophotographic printing apparatus according to claim 15, wherein said energizing means further includes means for inputting data to said operation controlling means, and said operation controlling means includes means for adjusting at least one of the first and second laser control voltages based on the data input by said inputting means.

17. An apparatus having a scanning area to be exposed by a laser beam for image formation, said apparatus comprising:

means for generating the laser beam having given intensities;

means for scanning the scanning area with the laser beam generated by said generating means, said scanning area having an exposure area for image formation and a non-exposure area outside of the exposure area;

sensing means located at the non-exposure area and responsive to the laser beam scanned by said scanning means, for sensing the laser beam directed to the non-exposure area to provide a sense signal;

means for energizing the laser beam generated by said generating means in accordance with the sense signal provided by said sensing means, so as to form an image at the exposure area;

first setting means for setting the laser beam generated by said generating means at one of the given intensities, said one of the given intensities corresponding to the density of the image forced at the exposure area by said energizing means;

second setting means for setting, independently of the setting by said first setting means, the laser beam generated by said generating means at another intensity which can be sensed by said sensing means; and means for selecting the given intensities of the laser beam so that the laser beam has the one intensity set by said laser setting means when said scanning means scans the laser beam at the exposure area and that the laser beam has the other intensity set by said second setting means when said sensing means senses the laser beam at the non-exposure area.

* * * * *